(12) United States Patent
Kim et al.

(10) Patent No.: US 9,307,194 B2
(45) Date of Patent: Apr. 5, 2016

(54) SYSTEM AND METHOD FOR VIDEO CALL

(71) Applicant: SAMSUNG SDS CO., LTD., Seoul (KR)

(72) Inventors: Chang Ho Kim, Seoul (KR); Hyoun Chul Lim, Seoul (KR); Jae Ho Yang, Anyang-si (KR); Hee Tae Yoon, Seoul (KR); Jung Hwan Moon, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/122,912

(22) PCT Filed: Jan. 29, 2013

(86) PCT No.: PCT/KR2013/000703
§ 371 (c)(1),
(2) Date: Sep. 18, 2014

(87) PCT Pub. No.: WO2013/115541
PCT Pub. Date: Aug. 8, 2013

(65) Prior Publication Data
US 2015/0070458 A1     Mar. 12, 2015

(30) Foreign Application Priority Data

Feb. 3, 2012  (KR) ......................... 10-2012-0011184
Nov. 27, 2012 (KR) ......................... 10-2012-0135149
Jan. 28, 2013 (KR) ......................... 10-2013-0009383

(51) Int. Cl.
*H04N 7/15*     (2006.01)
*H04N 7/14*     (2006.01)
(Continued)

(52) U.S. Cl.
CPC ....... *H04N 7/142* (2013.01); *G06T 3/60* (2013.01); *H04N 1/00244* (2013.01); *H04N 7/152* (2013.01); *H04N 2201/3252* (2013.01)

(58) Field of Classification Search
CPC ....... H04N 7/15; H04N 7/152; H04N 5/2628; H04L 65/403; H04L 12/1827; H04M 3/567
USPC ..................... 348/14.07, 14.08, 14.09, 14.01
See application file for complete search history.

(56) References Cited

U.S. PATENT DOCUMENTS 5,900,909 A  *  5/1999  Parulski et al. ............. 348/231.6
7,148,911 B1 * 12/2006  Mitsui et al. ............... 348/14.01
(Continued)

FOREIGN PATENT DOCUMENTS

EP    1298925 A2    4/2003
JP    2006-254166 A    9/2006
(Continued)

OTHER PUBLICATIONS

International Search Report (PCT/ISA/210), dated May 8, 2013, issued by the International Searching Authority in counterpart International Patent Application No. PCT/KR2013/000703.
(Continued)

*Primary Examiner* — Stella L Woo
(74) *Attorney, Agent, or Firm* — Sughrue Mion, PLLC

(57) ABSTRACT

Provided are a system and method for a video call. The system for a video call includes one or more terminals configured to transmit images obtained by capturing video call users, and a video call control server configured to generate a combined image by combining the images transmitted by the one or more terminals, and transmit the combined image to the terminals. Here, the respective images are rotated according to information on orientations sensed by the terminals, and combined into the combined image.

22 Claims, 12 Drawing Sheets

(51) Int. Cl.
*H04N 1/00* (2006.01)
*G06T 3/60* (2006.01)

(56) References Cited

U.S. PATENT DOCUMENTS

| | | | |
|---|---|---|---|
| 8,542,265 B1 * | 9/2013 | Dodd et al. | 348/14.08 |
| 8,803,999 B2 * | 8/2014 | Wilson et al. | 348/222.1 |
| 2001/0008412 A1 * | 7/2001 | Ando et al. | 348/14.02 |
| 2005/0052526 A1 * | 3/2005 | Kim | 348/14.02 |
| 2009/0309897 A1 | 12/2009 | Morita et al. | |
| 2011/0249073 A1 | 10/2011 | Cranfill et al. | |
| 2013/0106988 A1 * | 5/2013 | Davis et al. | 348/14.09 |

FOREIGN PATENT DOCUMENTS

| | | |
|---|---|---|
| JP | 2009-194857 A | 8/2009 |
| JP | 2010-239327 A | 10/2010 |
| KR | 10-2007-0082489 A | 8/2007 |

OTHER PUBLICATIONS

Communication issued on Dec. 18, 2015 by the European Patent Office in related Application No. 13743668.9.

* cited by examiner

SYSTEM AND METHOD FOR VIDEO CALL

CROSS-REFERENCE TO RELATED APPLICATION

This application is a National Phase of International Application No. PCT/KR2013/000703, filed on Jan. 29, 2013, which claims priority to and the benefit of Republic of Korea Patent Application Nos. 10-2012-0011184 filed on Feb. 3, 2012, 10-2012-0135149 filed on Nov. 27, 2012, and 10-2013-0009383, filed on Jan. 28, 2013, the disclosures of all of which are incorporated herein by reference in their entirety.

BACKGROUND

1. Field

The present disclosure relates to video call technology, and, more particularly, to a system and method, for a video call, that display respective users in the same direction as a reference orientation or a reference posture in a video screen.

2. Discussion of Related Art

Recent developments in information and communications technology have allowed a video call as well as a voice call through a portable terminal. In a video call service, users capture their own images using cameras attached to portable terminals and then transmit the images to counterpart portable terminals so that they can talk with each other while looking at their counterparts.

A video call service can provide a one-to-one video call between a caller and a called party and a group video call. Here, group video calls are mainly made through a control device called a multipoint control unit (MCU). The MCU is a device that receives voice and images transmitted by respective portable terminals, combines the plurality of voices and images into one, and then transmits the combined voice and image data to the respective portable terminals.

FIG. 1 is a diagram showing an existing video call system employing an MCU.

Referring to FIG. 1, in an existing video call system, since an MCU 20 combines images a, b, c, and d transmitted by respective portable terminals 11, 12, 13, and 14 as they are, and then delivers a combined image I, to the respective portable terminals 11 to 14. The images a to d in the combined image I may have different display orientations according to the various orientations being used by users of the respective terminals 11 to 14 during the video call.

For example, when the portable terminal 11 and the portable terminal 14 are rotated by 90 degrees clockwise with respect to a reference orientation, and capture images, and the portable terminal 12 and the portable terminal 13 capture images in the reference orientation, the images a and d captured by the portable terminal 11 and the portable terminal 14 each are combined by the MCU 20 in their then-active orientation, i.e., rotated by 90 degrees counterclockwise. The images b and c, however, captured by the portable terminal 12 and the portable terminal 13 are each combined by the MCU 20 in their then-active orientation, namely, the reference orientation.

In this case, when users of the respective portable terminals 11 to 14 look at the combined image I, the images a and d in the combined image I are shown in the orientation rotated by 90 degrees counterclockwise, and thus the viewers see a combined image that looks strange and is hard on the eyes.

SUMMARY

Aspects of the present disclosure are directed to providing a terminal and a video call control server that cause each video call user to be displayed as if oriented in a reference direction in a captured image, even when the terminal is rotated, and a system and method for a video call using the terminal and the video call control server.

According to an exemplary embodiment, there is provided a system for a video call, including: one or more terminals configured to transmit images obtained by capturing video call users; and a video call control server configured to generate a combined image by combining the images transmitted by the one or more terminals, and to transmit the combined image to the terminals. Here, one or more of the respective images are rotated, prior to transmitting the combined image, based on orientation information sensed by the one or more terminals.

According to another exemplary embodiment, there is provided a method for a video call, including: transmitting, at one or more terminals, respective images obtained by capturing video call users; generating a combined image, at a video call control server, by combining the respective images; and transmitting the combined image from the video call control server to the one or more terminals. Here, the respective images are rotated, prior to the transmitting of the combined image, based on orientation information sensed by the one or more terminals.

According to another exemplary embodiment, there is provided a video call control server, including: a communicator configured to receive respective orientation information and original respective images from one or more terminals; an image rotator configured to rotate the original respective images from at least one of the one or more terminals from a captured orientation to a reference orientation based on the respective orientation information of the at least one of the one or more terminals to provide rotated respective images; and a combined image generator configured to generate a combined image by combining the rotated respective images and any of the original respective images already in the reference orientation. Here, the communicator transmits the combined image to the one or more terminals. Also, one or more of the communicator, the image rotator, and the combined image generator are implemented by a hardware processor.

According to yet another exemplary embodiment, there is provided a video call control server, including: a communicator configured to receive captured video images from one or more terminals; an image analyzer configured to detect screen modes of the respective terminals from the received captured video images; a combined image generator configured to generate a combined image by combining the received captured video images based on the detected screen modes of the one or more terminals; and a hardware processor implementing one or more of the communicator, the image analyzer, and the combined image generator. Here, the communicator is further configured to transmit the combined image to the one or more terminals.

In another exemplary embodiment, there is provided a terminal used in a video call system, including: a capturing unit configured to capture video images; an orientation sensor configured to sense a terminal rotation state with respect to a previously set reference orientation; an image rotator configured to rotate the captured video images, according to the terminal rotation state, to provide rotated video images; a video call unit configured to transmit one of the captured video images and the rotated video images based on the terminal rotation state; and a hardware processor implementing at least one of the capturing unit, the orientation sensor, the image rotator, and the video call unit.

BRIEF DESCRIPTION OF THE DRAWINGS

The above and other objects, features, and advantages of the inventive concept will become more apparent from a detailed description of various exemplary embodiments thereof with reference to the accompanying drawings, in which.

DETAILED DESCRIPTION OF EXEMPLARY EMBODIMENTS

Figure 1:
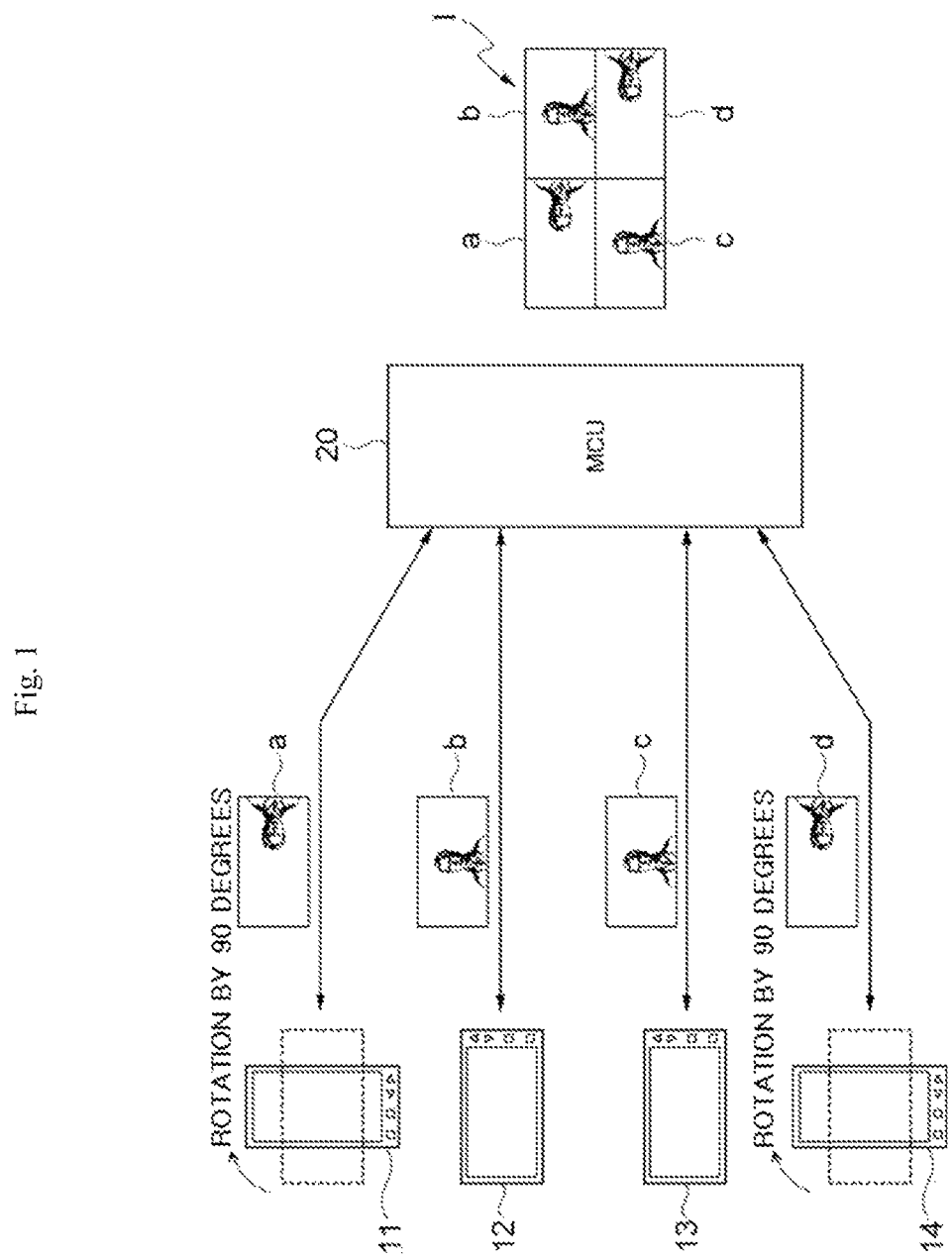
FIG. 1 is a diagram showing an existing video call system employing a multipoint control unit (MCU)

Hereinafter, detailed example embodiments will be described with reference to the accompanying drawings. However, the described embodiments are merely examples and not to be construed as limiting the scope of the present disclosure.

To avoid obscuring the key points, details familiar to those who work in this field are intentionally omitted. Terminology described below is defined considering functions in the present disclosure and may vary according to a user's or operator's intention or usual practice. Thus, the meanings of the terminology should be interpreted based on the overall context of the present specification.

The scope and spirit of the inventive concept are to be determined with reference to the appended claims, to that end, the following exemplary embodiments are provided only to efficiently describe the inventive concept to those of ordinary skill in the art.

A system for a video call according to an exemplary embodiment includes one or more terminals that transmit images obtained by capturing or photographing video call users, and a video call control server that generates a combined image by combining the images transmitted by the one or more terminals and transmitting the combined image to the terminals. Here, the respective images are rotated according to information on orientations sensed by the terminals, and combined into the combined image.

In an exemplary embodiment, the terminal may be configured to transmit the orientation information to the video call control server. In this case, the video call control server may rotate the images received from the terminals to a reference orientation according to the orientation information, and generate the combined image by combining the rotated images.

The terminals may transmit aspect ratio information on the terminals to the video call control server together with the orientation information. Also, when the orientations of the terminals are changed after the orientation information is transmitted, the terminals may transmit updated orientation information corresponding to the changed orientations to the video call control server.

In another exemplary embodiment, the terminals may sense their orientations, rotate captured images to a reference orientation according to information on the sensed orientations, and transmit the rotated images to the video call control server. Also, when the orientations of the terminals are changed after the orientation information is transmitted, the terminals may rotate captured images according to orientation information corresponding to the changed orientations, and transmit the rotated images to the video call control server.

In this case, the video call control server may check screen modes of the terminals using the images transmitted by the terminals, generate the combined image according to the screen modes, and transmit the combined image to the terminals. Also, the video call control server may check aspect ratios together with the screen modes of the terminals using the images received from the terminals, generate the combined image according to the screen modes and the aspect ratios, and transmit the combined image to the terminals.

A method for a video call according to exemplary embodiments includes transmitting, at one or more terminals, images obtained by capturing video call users, generating, at a video call control server, a combined image by combining the images transmitted by the one or more terminals, and transmitting, at the video call control server, the combined image to the terminals. The respective images constituting the combined image are rotated according to information on orientations sensed by the terminals, and combined.

In an exemplary embodiment, transmitting the images may further include transmitting the orientation information on the terminals to the video call control server. In this case, generating the combined image may include rotating the images received from the terminals to a reference orientation according to the received orientation information, and generating the combined image by combining the rotated images.

In addition, transmitting the images may further include transmitting aspect ratio information on the terminals to the video call control server together with the orientation information.

Meanwhile, when the orientations of the terminals are changed after transmission of the orientation information, the terminals may transmit orientation information corresponding to the changed orientations to the video call control server.

In another exemplary embodiment, transmitting the images may further include sensing orientations of the terminals, and rotating the captured images to a reference orientation according to information on the sensed orientations and transmitting the rotated images to the video call control server. In this case, when the orientations of the terminals are changed after the orientation information is transmitted, the terminals may rotate the captured images according to orientation information corresponding to the changed orientations and transmit the rotated images to the video call control server.

Generating the combined image may further include checking screen modes of the terminals using the images transmitted by the terminals, and generating the combined image according to the screen modes. Also, generating the combined image may further include checking aspect ratios of the terminals together with the screen modes using the images received from the terminals, and generating the combined image according to the screen modes and the aspect ratios.

A system for a video call configured as described above according to exemplary embodiments will be described in detail below.

Figure 2:
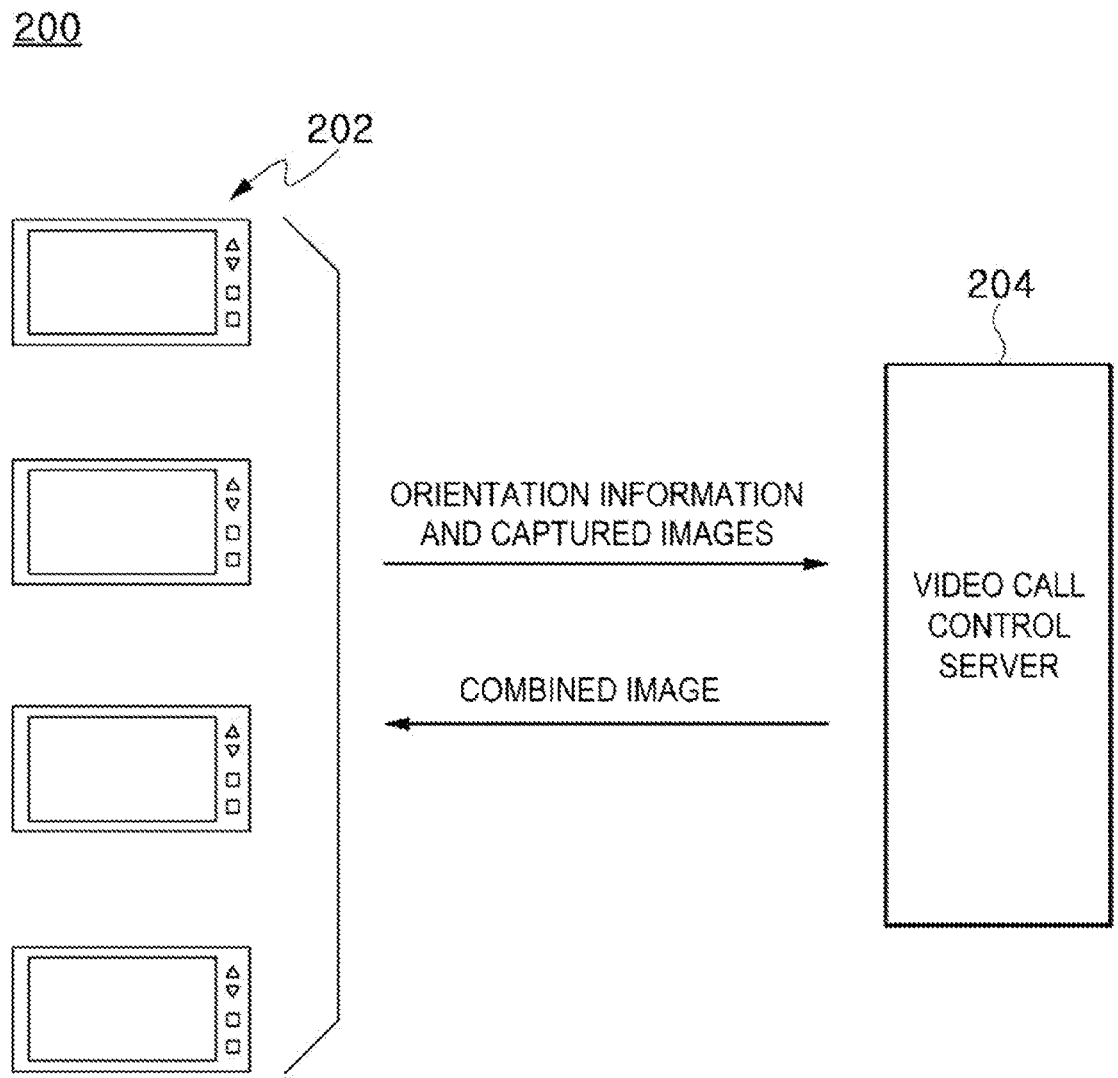
FIG. 2 is a diagram of a system for a video call according to a first exemplary embodiment.

FIG. 2 is a diagram of a system for a video call according to a first exemplary embodiment.

Referring to FIG. 2, a system 200 for a video call according to this exemplary embodiment includes a plurality of terminals 202 and a video call control server 204. Although four terminals 202 are shown in the drawing, the number of terminals 202 is not limited to four, and two or more terminals 202 may be used.

Each of the terminals 202 requests a video call from the video call control server 204. In this embodiment and the following embodiments, the terminals 202 may include all types of terminals such as a portable terminal, a fixed terminal, a wireless terminal, a wired terminal, etc. capable of participating in a video call. For example, a cellular phone such as a smartphone, a personal digital assistant (PDA), a tablet personal computer (PC), a laptop computer, or a desktop computer may be a terminal in the present disclosure. As an example of the terminals 202, a portable terminal in the form of a cellular phone is shown here, but the terminals 202 are not limited to portable terminals in the form of a cellular phone.

Each of the terminals 202 transmits orientation information about the terminal 202 itself to the video call control server 204 while requesting the video call from the video call control server 204. Here, the orientation information is any type of information that can be used to determine how much the corresponding terminal 202 has been rotated with respect to a reference orientation.

Figure 3:
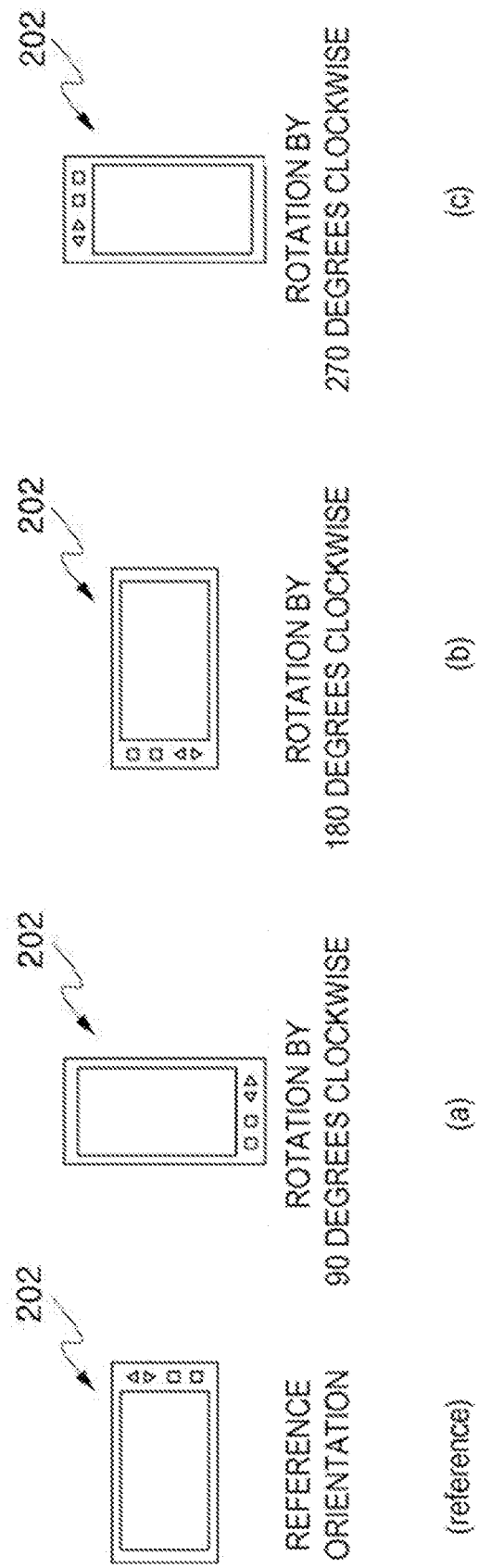
FIG. 3 is a diagram showing orientations of a terminal according to the first exemplary embodiment rotated with respect to a reference orientation.

FIG. 3 is a diagram showing orientations of a terminal according to the first exemplary embodiment rotated with respect to a reference orientation. Referring to FIG. 3, each terminal 202 may be in a state as shown in FIG. 3 (reference) in which the terminal 202 is in a reference orientation. Likewise, each terminal 202 may be in a state as shown in FIG. 3 (a) in which the terminal 202 is rotated by 90 degrees clockwise with respect to a reference orientation (i.e., rotated by 270 degrees counterclockwise with respect to the reference orientation). Likewise, each terminal 202 may be in a state as shown in FIG. 3 (b) in which the terminal 202 is rotated by 180 degrees clockwise with respect to the reference orientation (rotated by 180 degrees counterclockwise with respect to the reference orientation). Finally, each terminal 202 may be in a state as shown in FIG. 3 (c) in which the terminal 202 is rotated by 270 degrees clockwise with respect to the reference orientation (rotated by 90 degrees counterclockwise with respect to the reference orientation).

Here, the rotation state of the terminal 202 is understood to vary from the reference orientation in multiples of 90 degrees (i.e., 0 degree, 90 degrees, 180 degrees, and 270 degrees), and this rotation state depends upon how much a user rotates the terminal 202. Since it is practically impossible for a human user carrying the terminal 202 in one hand to consistently rotate the terminal 202 at an accurate angle, a threshold value for a rotation angle of the terminal 202 may be set in advance, and the rotation state may be changed according to the threshold value. For example, the rotation state may be set to the reference state when the rotation angle of the terminal 202 is −45 degrees to 45 degrees; rotated by 90 degrees clockwise when the rotation angle is 46 degrees to 135 degrees; rotated by 180 degrees clockwise when the rotation angle is 136 degrees to 225 degrees; and rotated by 270 degrees clockwise when the rotation angle is 226 degrees to 315 degrees.

The reference orientation of the terminal 202 may vary according to a setting, a communication service provider, etc., of the terminal 202. For example, a state in which the screen of the terminal 202 is horizontally or vertically placed may be determined as the reference orientation.

In this way, each terminal 202 transmits its own orientation information, dependent on a state in which the terminal 202 is rotated with respect to the reference orientation, to the video call control server 204. Meanwhile, when its own orientation is changed at a time after a terminal 202 has already transmitted its own orientation information to the video call control server 204, the terminal 202 again transmits orientation information indicating the changed orientation to the video call control server 204.

In addition, each terminal 202 may transmit its own reference aspect ratio information to the video call control server 204. Here, the reference aspect ratio information denotes a width-to-height ratio of the corresponding terminal 202 in the reference orientation. For example, width-to-height aspect ratios of the terminals 202 may be 4:3 or 16:9 in the reference orientation, and each terminal 202 may transmit such reference aspect ratio information to the video call control server 204. At this time, each terminal 202 may transmit its own orientation information and reference aspect ratio information using a session initiation protocol (SIP) message.

Each terminal 202 transmits an image obtained by capturing a user to the video call control server 204. At this time, the image may be shown to be rotated by a predetermined angle with respect to a reference orientation according to a orientation of the terminal 202 when capturing the image. For example, when the terminal 202 is rotated by 90 degrees clockwise with respect to the reference orientation to capture the user, an image obtained by capturing the user is shown to be rotated by 90 degrees counterclockwise with respect to the reference orientation.

When an image transmitted from each terminal 202 has been rotated by the predetermined angle with respect to the reference orientation, the video call control server 204 rotates the image again to the reference orientation, and then generates a combined image by combining respective images.

Specifically, the video call control server 204 may check whether or not an image transmitted from each terminal 202 has been rotated by the predetermined angle with respect to the reference orientation using orientation information transmitted from the terminal 202. When it is checked that the image transmitted by the terminal 202 has been rotated by the predetermined angle with respect to the reference orientation, the video call control server 204 rotates the image again to the reference orientation. For example, when the image transmitted by the terminal 202 has been rotated by 90 degrees counterclockwise with respect to the reference orientation, the video call control server 204 rotates the image by 90 degrees clockwise (or 270 degrees counterclockwise) to place the image in the reference orientation.

Then, all images transmitted by the respective terminals 202 are placed in the reference orientation. The video call control server 204 generates the combined image by combining the images all placed in the reference orientation, and then transmits the combined image to the respective terminals 202.

At this time, when reference aspect ratio information has been transmitted from each terminal 202, the video call control server 204 generates the combined image with an aspect ratio corresponding to the reference aspect ratio information, and then transmits the combined image to the terminals 202. For example, when an aspect ratio of a terminal 202 is 4:3, the video call control server 204 generates the combined image with an aspect ratio of 4:3, and then transmits the combined image to the terminal 202. Also, when an aspect ratio of a terminal 202 is 16:9, the video call control server 204 generates the combined image with an aspect ratio of 16:9, and then transmits the combined image to the terminal 202.

At this time, the video call control server 204 may separately generate as many combined images according to each of aspect ratios of the respective terminals 202, and then transmit the combined images according to the aspect ratios of the respective terminals 202 to the corresponding terminals 202. For example, when the respective terminals 202 have two types of aspect ratios of 4:3 and 16:9, the video call control server 204 may separately generate a combined image having an aspect ratio of 4:3 and a combined image having an aspect ratio of 16:9, and then transmit the combined image having the aspect ratio of 4:3 to respective terminals 202 having the aspect ratio of 4:3 and the combined image having the aspect ratio of 16:9 to respective terminals 202 having the aspect ratio of 16:9.

In addition, according to an exemplary embodiment, the video call control server 204 checks orientation information on each terminal 202, and then transmits a combined image with an aspect ratio corresponding to a current orientation of the terminal 202 to the terminal 202. For example, when an aspect ratio of a terminal 202 is 4:3, and the terminal 202 is currently in the reference orientation, the video call control server 204 generates a combined image with an aspect ratio of 4:3 and transmits the combined image to the terminal 202. Also, according to an exemplary embodiment, when an aspect ratio of a terminal 202 is 4:3, and the terminal 202 has been rotated by 90 degrees clockwise with respect to the reference orientation, the video call control server 204 generates a combined image with an aspect ratio of 3:4 and then transmits the combined image to the terminal 202.

In an exemplary embodiment, each terminal 202 transmits its own orientation information to the video call control server 204, and the video call control server 204 rotates an image rotated by a predetermined angle with respect to a reference orientation to the reference orientation again and then generates a combined image so that respective terminals 202 can receive the combined image in which respective images are placed in the reference orientation from the video call control server 204 even when the respective terminals 202 capture users in different orientations and transmit the captured images. In this case, the users of the respective terminals 202 can do a video call without having to view images of other users in an unnatural rotation.

Figure 4:
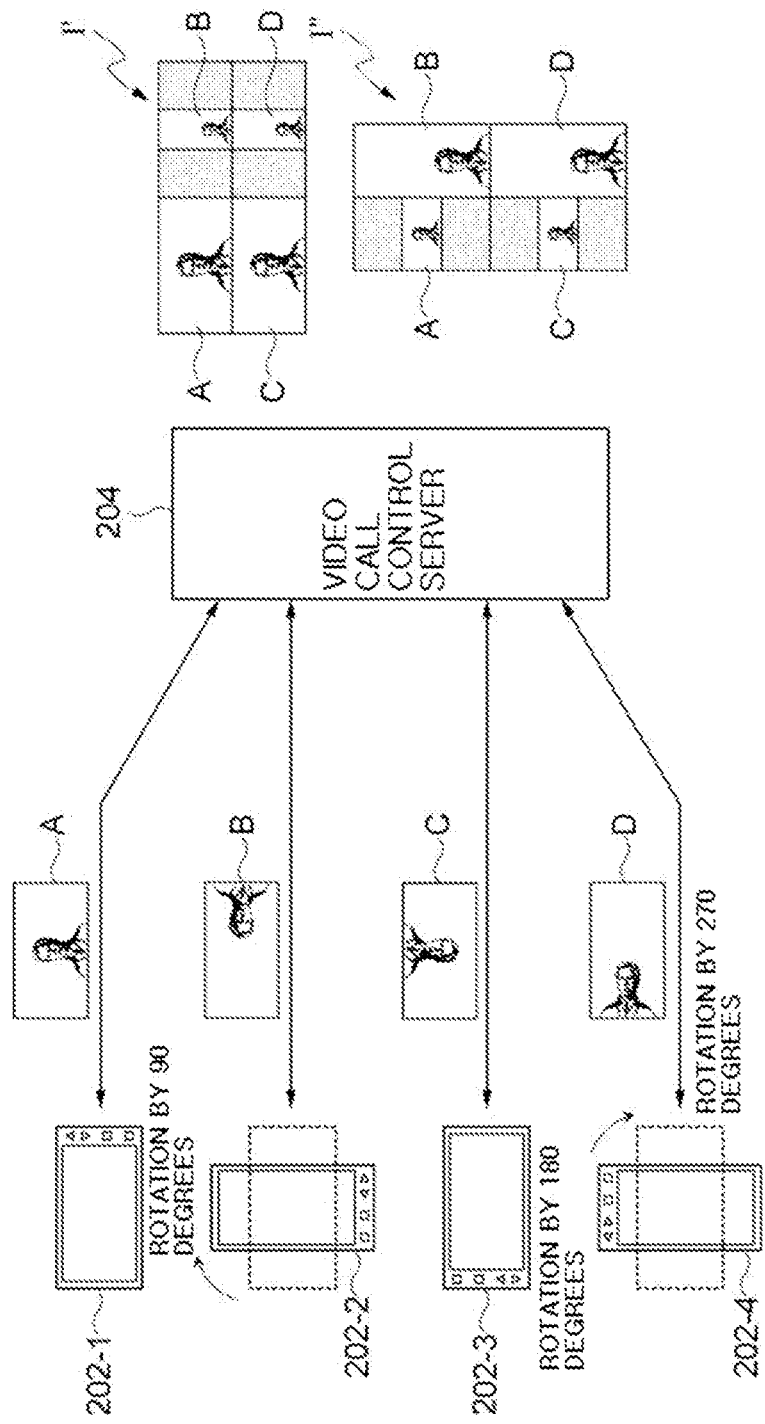
FIG. 4 is a diagram illustrating a process in which a video call control server rotates images using orientation information transmitted from respective terminals and then generates a combined image in the system for a video call according to the first exemplary embodiment.

FIG. 4 is a diagram illustrating a process in which a video call control server rotates images using orientation information transmitted from respective terminals and then generates a combined image in the system for a video call according to the first exemplary embodiment.

Referring to FIG. 4, a terminal 202-1 transmits an image A captured in a reference orientation to the video call control server 204, a terminal 202-2 transmits an image B captured in a state in which the terminal 202-2 has been rotated by 90 degrees clockwise with respect to the reference orientation to the video call control server 204, a terminal 202-3 transmits an image C captured in a state in which the terminal 202-3 has been rotated by 180 degrees clockwise with respect to the reference orientation to the video call control server 204, and a terminal 202-4 transmits an image D captured in a state in which the terminal 202-4 has been rotated by 270 degrees clockwise with respect to the reference orientation to the video call control server 204. In this case, the image B, the image C, and the image D are shown to be rotated by 90 degrees, 180 degrees, and 270 degrees counterclockwise with respect to the reference orientation, respectively. Here, the respective terminals 202-1, 202-2, 202-3 and 202-4 may transmit their own orientation information and reference aspect ratio information to the video call control server 204 in advance of the images A, B, C and D.

Then, the video call control server 204 finds that the image B, the image C, and the image D have been rotated by 90 degrees, 180 degrees, and 270 degrees counterclockwise with respect to the reference orientation respectively from the orientation information received from the respective terminals 202-1, 202-2, 202-3, and 202-4. In this case, the video call control server 204 rotates the image B, the image C, and the image D by 90 degrees, 180 degrees, and 270 degrees clockwise respectively to place them in the reference orientation, generates a combined image by combining the images A, B, C, and D, and then transmits the combined image to the respective terminals 202-1, 202-2, 202-3, and 202-4.

At this time, assuming that an aspect ratio of the respective terminals 202-1, 202-2, 202-3, and 202-4 is 16:9, a current aspect ratio of the terminals 202-1 and 202-3 is 16:9, and thus the video call control server 204 generates a combined image I' with an aspect ratio of 16:9, and then transmits the combined image I' to the terminals 202-1 and 202-3. On the other hand, a current aspect ratio of the terminals 202-2 and 202-4 is 9:16, and thus the video call control server 204 generates a combined image I" with an aspect ratio of 9:16, and then transmits the combined image I" to the terminals 202-2 and 202-4.

In the combined image I' and the combined image I", the respective images A, B, C, and D are shown to have the same aspect ratios as the original images. However, the present disclosure is not limited to this, and the respective images A, B, C, and D may be processed with at least one of a different aspect ratio and screen size than those of the original images and combined in the combined image I' and the combined image I". For example, when the respective images A, B, C, and D have the same aspect ratios as the original images in the combine image I', there are empty spaces on the left and right of the images B and D in the combined image I', and there are empty spaces above and under the images A and C in the combined image I". To prevent the presence of empty spaces above and under each image or on the left and right of the image in the combined images I' and I", aspect ratios and screen sizes of images may be adjusted and combined. For example, in the combined image I', the upper and lower sides of the images B and D may be cut off, and the sizes of the images B and D may be adjusted so that faces of video call users occupy the entire corresponding screen. Also, in the combined image I", the left and right sides of the images A and C may be cut off. In addition, when a part of an image is cut off so as to be combined into a combined image, a face of a person in the image may be recognized so as not to cut off part of the face. Since image recognition technology is well known in the technical field to which the present disclosure pertains, detailed description thereof will be omitted.

Figure 5:
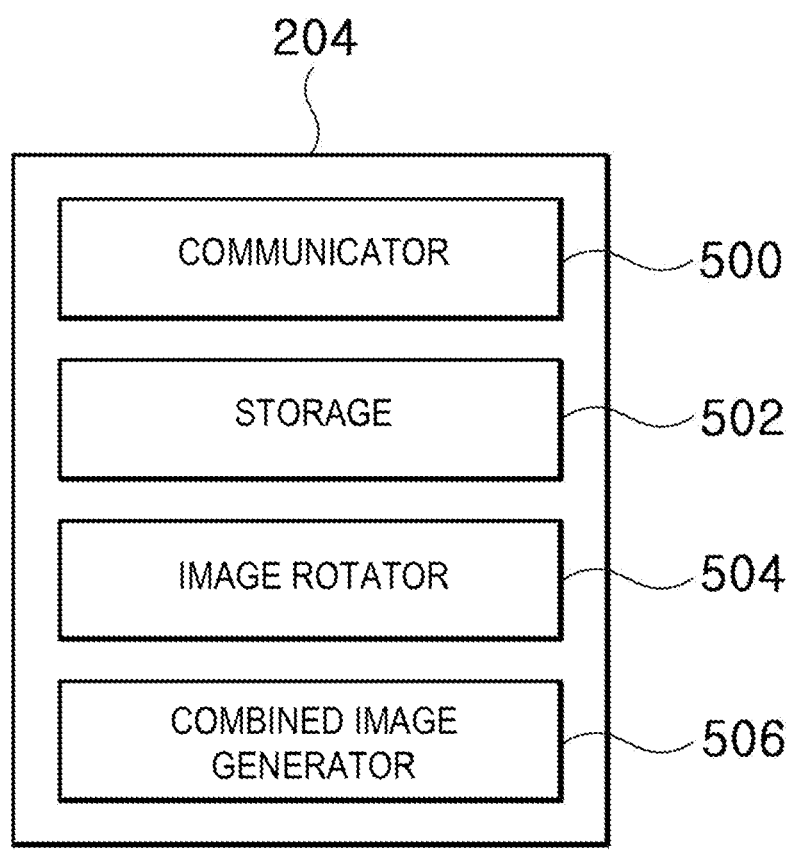
FIG. 5 is a block diagram showing a constitution of a video call control server according to the first exemplary embodiment.

FIG. 5 is a block diagram showing a constitution of a video call control server according to the first exemplary embodiment. Referring to FIG. 5, the video call control server 204 includes a communicator 500, a storage 502, an image rotator 504, and a combined image generator 506.

The communicator 500 receives orientation information, and images obtained by capturing users of the corresponding terminals 202, from the respective terminals 202. The communicator 500 may also receive reference aspect ratio information from the respective terminals 202. Also, the communicator 500 transmits a combined image, generated by the combined image generator 506, to the respective terminals 202.

The storage 502 stores the orientation information and captured images of the respective terminals 202 received by the communicator 500. The storage 502 may also store the reference aspect ratio information on the respective terminals 202 received by the communicator 500.

The image rotator 504 checks whether or not there is an image required to be rotated to a reference orientation, among the images transmitted by the respective terminals 202, based on the orientation information on the respective terminals 202. When there is an image required to be rotated to the reference orientation, the image rotator 504 rotates the image to place the image in the reference orientation.

The combined image generator 506 generates a combined image by combining images that are not required to be rotated to the reference orientation (i.e., images having been already placed in the reference orientation) among the images received from the respective terminals 202 and images that have been rotated to the reference orientation by the image rotator 504 among the images received from the respective terminals 202. At this time, the combined image generator 506 may generate the combined image with an aspect ratio corresponding to the reference aspect ratio information and the orientation information transmitted by the respective terminals 202.

Figure 6:
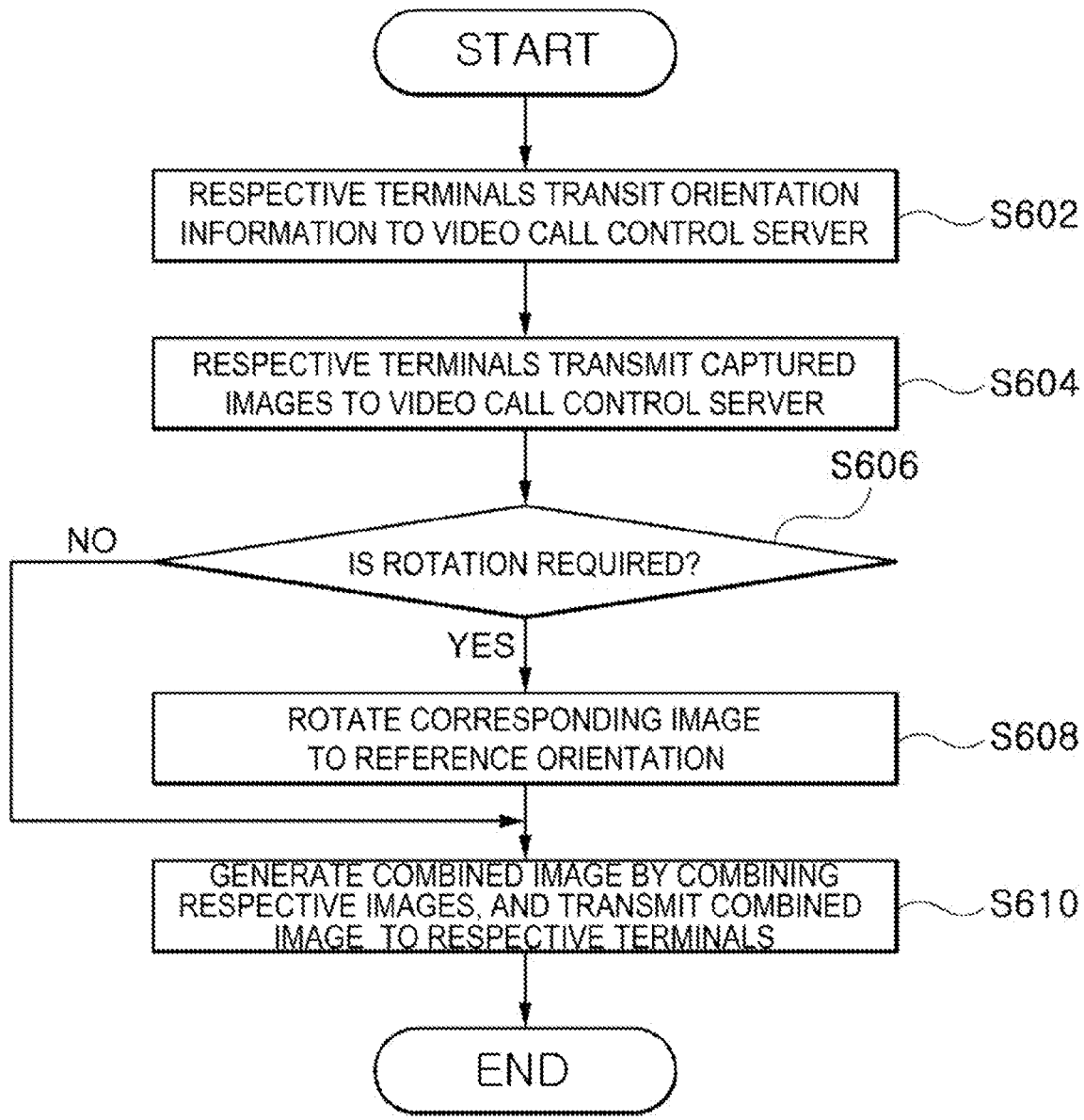
FIG. 6 is a flowchart illustrating a method for a video call according to the first exemplary embodiment.

FIG. 6 is a flowchart illustrating a method for a video call according to the first exemplary embodiment.

Referring to FIG. 6, while requesting a video call from the video call control server 204, the respective terminals 202 transmit their own orientation information to the video call control server 204 (S602). At this time, the respective terminals 202 may transmit their own reference aspect ratio information together with the orientation information. However, the reference aspect ratio information is not necessarily transmitted together with the orientation information, and may be transmitted separately from the orientation information, according to an exemplary embodiment.

Next, the respective terminals 202 transmit images obtained by capturing users to the video call control server 204 (S604). At this time, the images transmitted to the video call control server 204 may be shown to be rotated by a predetermined angle with respect to a reference orientation according to orientations of the respective terminals 202 when capturing.

Next, the video call control server 204 checks whether or not there is an image required to be rotated to the reference orientation among the images received from the respective terminals 202 using the orientation information received from the respective terminals 202 (S606).

When it is checked in S606 that there is an image required to be rotated to the reference orientation, the video call control server 204 rotates the image to the reference orientation (S608). When images required to be rotated to the reference orientation are rotated to the reference orientation, all the images received from the respective terminals 202 are placed in the reference orientation.

Next, the video call control server 204 generates a combined image by combining the images placed in the reference orientation, and then transmits the combined image to the respective terminals 202 (S610). Here, when the reference aspect ratio information has been transmitted from the respective terminals 202, the video call control server 204 generates the combined image with an aspect ratio corresponding to the reference aspect ratio information and the orientation information, and then transmits the combined image to the respective terminals 202.

Meanwhile, when its own orientation is changed after each terminal 202 transmits its own orientation information to the video call control server 204, the terminal 202 may transmit orientation information corresponding to the changed orientation to the video call control server 204 again.

Figure 7:
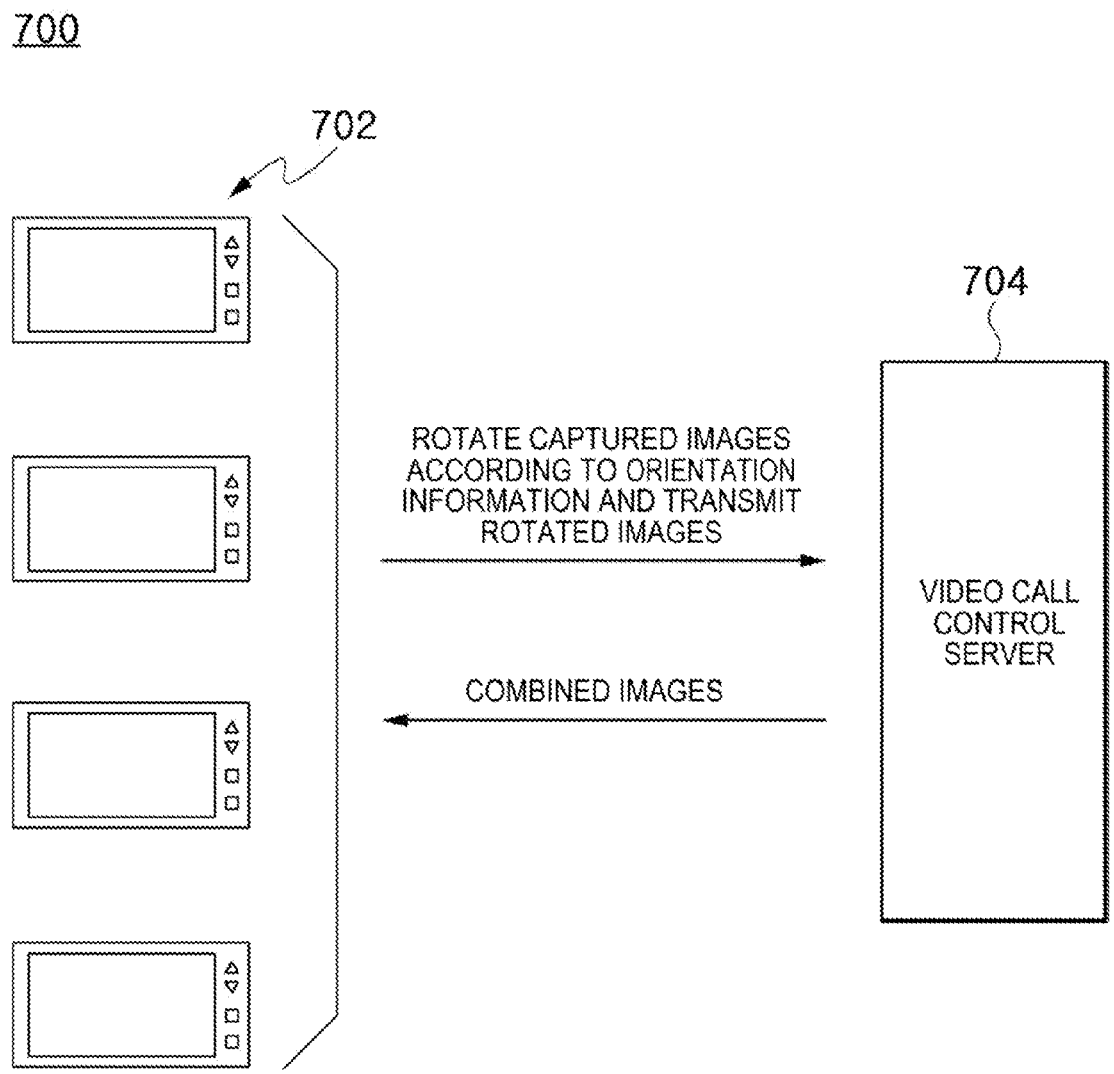
FIG. 7 is a diagram of a system for a video call according to a second exemplary embodiment.

FIG. 7 is a diagram of a system for a video call according to a second exemplary embodiment.

Referring to FIG. 7, a system 700 for a video call according to the second exemplary embodiment includes a plurality of terminals 702 and a video call control server 704. Although four terminals 702 are shown in the drawing, the number of terminals 702 is not limited to four, and two or more terminals 702 may be used.

Each of the terminals 702 transmits an image captured by the terminal 702 itself to the video call control server 704 while requesting a video call from the video call control server 704. At this time, after checking its own orientation information, each of the terminals 702 rotates the captured image according to the orientation information, and transmits the rotated image to the video call control server 704. Here, the orientation information denotes how much a current orientation of the terminal 702 has been rotated with respect to a previously set reference orientation.

Figure 8:
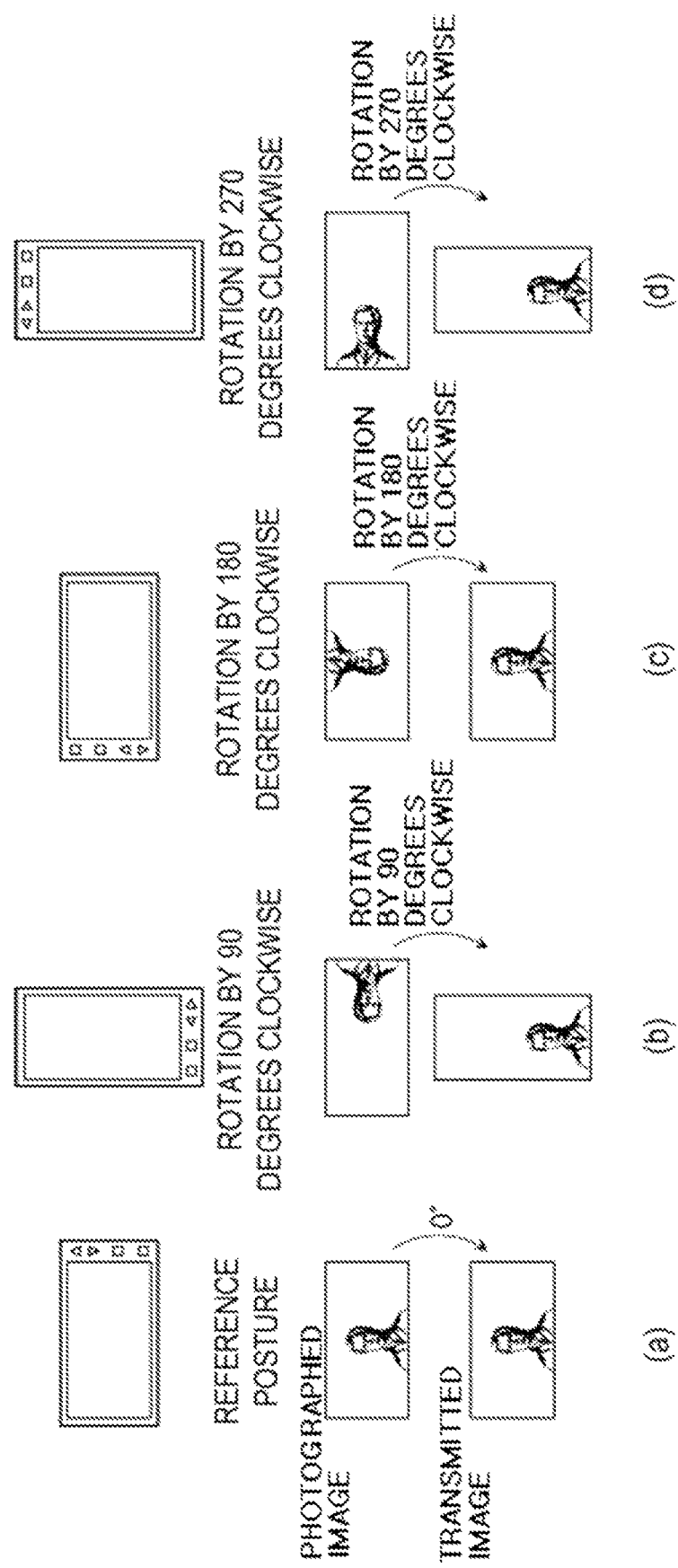
FIG. 8 is a diagram showing orientations of a terminal according to the second exemplary embodiment rotated by every 90 degrees clockwise with respect to a reference orientation and captured images rotated according to the orientations rotated with respect to the reference orientation.

FIG. 8 is a diagram showing orientations of a terminal according to the second exemplary embodiment rotated by every 90 degrees clockwise with respect to a reference orientation and captured images rotated according to the orientations rotated with respect to the reference orientation.

Referring to FIG. 8 (a), a terminal 702 is in a reference orientation. In FIG. 8 (b) the terminal 702 is rotated by 90 degrees clockwise with respect to the reference orientation (rotated by 270 degrees counterclockwise with respect to the reference orientation). In FIG. 8 (c), the terminal 702 is rotated by 180 degrees clockwise with respect to the reference orientation (rotated by 180 degrees counterclockwise with respect to the reference orientation). In FIG. 8 (d) the terminal 702 is rotated by 270 degrees clockwise with respect to the reference orientation (rotated by 90 degrees counterclockwise with respect to the reference orientation).

In other words, a rotation state of the terminal 702 changes from the reference orientation at multiples of 90 degrees (i.e., 0 degree, 90 degrees, 180 degrees, and 270 degrees), and varies according to how much a user rotates the terminal 702. As described in the first exemplary embodiment, since it is practically impossible for a user to consistently rotate the terminal 702 by hand at an accurate angle, a threshold value of a rotation angle of the terminal 702 may be set in advance, and the rotation state may be changed according to the threshold value.

As shown in (a) of FIG. 8, when the terminal 702 is in the reference orientation, the terminal 702 transmits a captured image to the video call control server 704 as it is. Here, the image is transmitted to the video call control server 704 in a horizontal screen mode. In exemplary embodiments, the horizontal screen mode denotes a case in which a horizontal screen length (or resolution) of the corresponding image is greater than a vertical screen length, and a vertical screen mode denotes a case in which a vertical screen length (or resolution) of the corresponding image is greater than a horizontal screen length. For example, an aspect ratio of the corresponding image may be set to 4:3 or 16:9 in the horizontal screen mode, and set to 3:4 or 9:16 in the vertical screen mode.

As shown in (b) of FIG. 8, when the terminal 702 has been rotated by 90 degrees clockwise with respect to the reference orientation, an image captured by the terminal 702 is displayed to be rotated by 90 degrees counterclockwise. At this time, the terminal 702 rotates the captured image by 90 degrees clockwise and transmits the rotated image to the video call control server 704 so that a video call user is displayed in a reference direction in the captured image. The reference direction denotes a direction in which a video call user is displayed in a normal orientation in a captured image (e.g., a orientation in which the video call user's head is directed upward in the captured image). Here, the image transmitted to the video call control server 704 is transmitted in the vertical screen mode.

As shown in (c) of FIG. 8, when the terminal 702 has been rotated by 180 degrees clockwise with respect to the reference orientation, an image captured by the terminal 702 is displayed to be rotated by 180 degrees counterclockwise. At this time, the terminal 702 rotates the captured image by 180 degrees clockwise and transmits the rotated image to the video call control server 704 so that the video call user is displayed in the reference direction in the captured image. Here, the image transmitted to the video call control server 704 is transmitted in the horizontal screen mode.

As shown in (d) of FIG. 8, when the terminal 702 has been rotated by 270 degrees clockwise with respect to the reference orientation, an image captured by the terminal 702 is displayed to be rotated by 270 degrees counterclockwise. At this time, the terminal 702 rotates the captured image by 270 degrees clockwise and transmits the rotated image to the video call control server 704 so that the video call user is displayed in the reference direction in the captured image. Here, the image transmitted to the video call control server 704 is transmitted in the vertical screen mode.

As described above, each terminal 702 checks how much a current orientation of the terminal 702 itself has been rotated with respect to a reference orientation (i.e., checks orientation information), rotates a captured image according to the checked orientation information, and then transmits the rotated image to the video call control server 704. Here, when each terminal 702 rotates a captured image so that a video call user is displayed in a reference direction in the captured image, even if the terminal 702 has been rotated with respect to the reference orientation, the video call user is displayed in the reference direction in the captured image.

When its own orientation is changed after each terminal 702 transmits a captured image, the terminal 702 may rotate a captured image according to the changed orientation using the same method as described above, and transmit the rotated image to the video call control server 704. Then, the video call control server 704 may analyze the captured image rotated according to the changed orientation, and then generate a combined image corresponding to a current screen mode of the terminal 702.

Here, since a state in which a terminal 702 is horizontally placed is set as a reference orientation, images in (a) and (c) of FIG. 8 are transmitted in the horizontal screen mode, and images in (b) and (d) of FIG. 8 are transmitted in the vertical screen mode. However, the reference orientation is not limited to the state in which a terminal 702 is horizontally placed.

Next, the video call control server 704 generates a combined image by combining the respective images transmitted from the respective terminals 702. At this time, the video call control server 704 may generate the combined image according to a current screen mode (i.e., the horizontal screen mode or the vertical screen mode) of the corresponding terminal 702.

Specifically, after checking the current screen mode (i.e., the horizontal screen mode or the vertical screen mode) of the corresponding terminal 702 using the respective images transmitted from the respective terminals 702, the video call control server 704 generates a combined image according to the current screen mode of the terminal 702 and transmits the combined image to the terminal 702. At this time, the video call control server 704 may transmit the combined image with an aspect ratio of the terminal 702. In other words, the video call control server 704 may generate a combined image according to the current screen mode and the aspect ratio of the terminal 702, and transmit the combined image to the terminal 702.

For example, when a current screen mode of a terminal 702 is the horizontal screen mode, and an aspect ratio is 4:3, the video call control server 704 may generate a combined image with an aspect ratio of 4:3 in the horizontal screen mode, and transmit the combined image to the terminal 702. Also, when a current screen mode of a terminal 702 is the vertical screen mode, and an aspect ratio is 16:9, the video call control server 704 may generate a combined image with an aspect ratio of 9:16 in the vertical screen mode, and transmit the combined image to the terminal 702.

At this time, the video call control server 704 may generate as many combined images as there are types of aspect ratios of the respective terminals 702, and then transmit the combined images according to current screen modes and aspect ratios of the respective terminals 702 to the corresponding terminals 702. For example, when the respective terminals 702 have two types of aspect ratios of 4:3 and 16:9, the video call control server 704 may separately generate a combined image having an aspect ratio of 4:3, a combined image having an aspect ratio of 3:4, a combined image having an aspect ratio of 16:9, and a combined image having an aspect ratio of 9:16, and then transmit the combined images to the respective terminals 702 according to the current screen modes and the aspect ratios of the respective terminals 702.

Every time an image is transmitted from each terminal 702 (or periodically), the video call control server 704 may analyze the image and check a current screen mode of the terminal 702. At this time, when a current screen mode of a terminal 702 has been changed, the video call control server 704 may generate a combined image according to the changed screen mode, and transmit the combined image to the terminal 702. For example, when a user rotates a terminal 702 from a horizontal orientation to a vertical orientation, the terminal 702 rotates an image according to the rotation direction and transmits the rotated image to the video call control server 704, and the video call control server 704 checks that a screen mode of a received image has been changed from the horizontal screen mode to the vertical screen mode and may generate a combined image according to the changed screen mode.

In this exemplary embodiment, each terminal 702 rotates a captured image according to its own orientation information and transmits the rotated image to the video call control server 704, and the video call control server 704 generates a combined image according to a current screen mode of the terminal 702 and transmits the combined image to the terminal 702. Thus, even when respective terminals 702 capture their users in different orientations to perform a video call, it is possible to receive a combined image in which the video call users are displayed in a reference direction from the video call control server 704. In this case, the users of the respective terminals 702 can enjoy the video call without having to view other users in an unnatural orientation.

Figure 9:
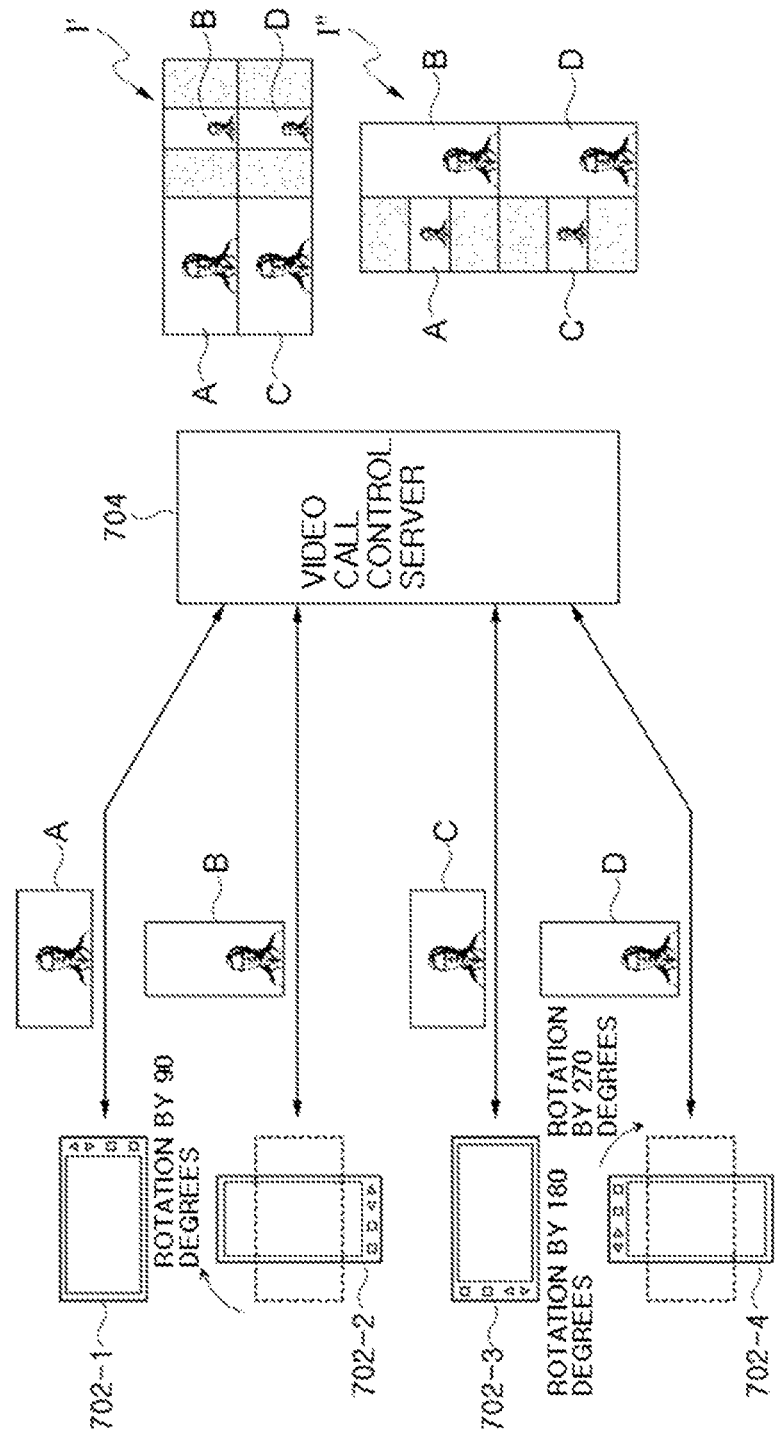
FIG. 9 is a diagram illustrating a process in which a video call control server according to the second exemplary embodiment generates a combined image using images transmitted from respective terminals.

FIG. 9 is a diagram illustrating a process in which a video call control server according to the second exemplary embodiment generates a combined image using images transmitted from respective terminals.

Referring to FIG. 9, a first terminal 702-1 transmits an image captured in a reference orientation to the video call control server 704 as it is, a second terminal 702-2 rotates an image captured in a state in which the second terminal 702-2 has been rotated by 90 degrees clockwise with respect to the reference orientation by 90 degrees clockwise and then transmits the rotated image to the video call control server 704, a third terminal 702-3 rotates an image captured in a state in which the third terminal 702-3 has been rotated by 180 degrees clockwise with respect to the reference orientation by 180 degrees clockwise and then transmits the rotated image to the video call control server 704, and a fourth terminal 702-4 rotates an image captured in a state in which the fourth terminal 702-4 has been rotated by 270 degrees clockwise with respect to the reference orientation by 270 degrees clockwise and then transmits the rotated image to the video call control server 704.

Here, a state in which the screen of a terminal 702 is horizontally placed is assumed to be the reference orientation. In this case, images A and C respectively transmitted from the first terminal 702-1 and the third terminal 702-3 are transmitted in the horizontal screen mode, and images B and D respectively transmitted from the second terminal 702-2 and the fourth terminal 702-4 are transmitted in the vertical screen mode. Also, an aspect ratio of the respective terminals 702 is assumed to be 16:9.

Then, the video call control server 704 may check current screen modes and aspect ratios of the first terminal 702-1 and the third terminal 702-3 using the images A and C respectively transmitted from the first terminal 702-1 and the third terminal 702-3. Also, the video call control server 704 may check current screen modes and aspect ratios of the second terminal 702-2 and the fourth terminal 702-4 using the images B and D respectively transmitted from the second terminal 702-2 and the fourth terminal 702-4.

In this case, the video call control server 704 combines the images A, B, C, and D to generate a combined image I' in the horizontal screen mode with an aspect ratio of 16:9, and then transmits the combined image I' to the first terminal 702-1 and the third terminal 702-3. Also, video call control server 704 combines the images A, B, C, and D to generate a combined image I" in the vertical screen mode with a aspect ratio of 9:16, and then transmits the combined image I" to the second terminal 702-2 and the fourth terminal 702-4.

As described in the first exemplary embodiment, the respective images A, B, C, and D may be processed with an aspect ratio and/or a screen size different from those of the original images, and combined in the combined image I' and the combined image I".

For example, as in the first exemplary embodiment, an aspect ratio or size may be adjusted to prevent the presence of empty spaces, or partial facial recognition may be performed to cut off a part of an image.

Figure 10:
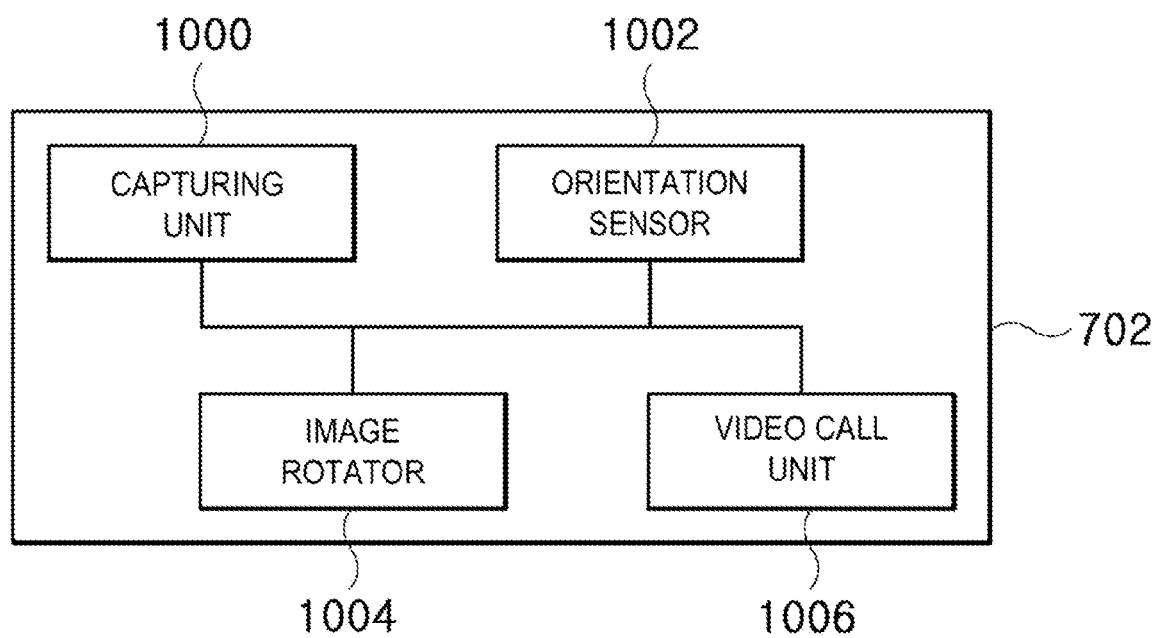
FIG. 10 is a block diagram showing a constitution of a terminal according to the second exemplary embodiment.

FIG. 10 is a block diagram showing a constitution of a terminal according to the second exemplary embodiment.

Referring to FIG. 10, a terminal 702 according to the second exemplary embodiment includes a capturing unit 1000, a orientation sensor 1002, an image rotator 1004, and a video call unit 1006.

The capturing unit 1000 captures its front using a camera. For example, the capturing unit 1000 may capture a video call user during a video call.

The orientation sensor 1002 obtains information on a orientation of the terminal 702. In other words, the orientation sensor 1002 senses how much the terminal 702 has been rotated with respect to a previously set reference orientation. The orientation sensor 1002 may include, for example, a gyro sensor, a gravity sensor, or so on.

The image rotator 1004 rotates the image captured by the capturing unit 1000 according to the orientation information on the terminal 702. For example, the image rotator 1004 checks the orientation information obtained by the orientation sensor 1002, and rotates the image captured by the capturing unit 1000 to display the video call user in a reference direction in the image when the terminal 702 has been rotated with respect to the reference orientation. In this case, even when the terminal 702 has been rotated with respect to the reference orientation, the video call user is displayed to be kept in the reference direction in the rotated image.

The image rotator 1004 delivers the rotated image or the image captured by the capturing unit 1000 to the video call unit 1006. In other words, when the terminal 702 maintains the reference orientation, the image rotator 1004 delivers the image captured by the capturing unit 1000 to the video call unit 1006 as it is.

The video call unit 1006 requests a video call from the video call control server 704. The video call unit 1006 transmits the image captured by the capturing unit 1000 or the image rotated by the image rotator 1004 to the video call control server 704. The video call unit 1006 receives a combined image from the video call control server 704.

Figure 11:
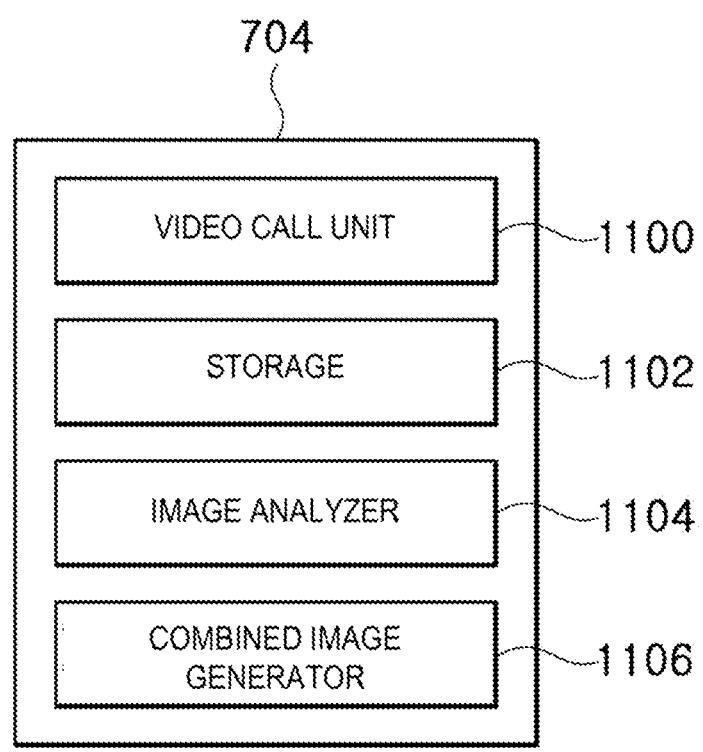
FIG. 11 is a block diagram showing a constitution of a video call control server according to the second exemplary embodiment.

FIG. 11 is a block diagram showing a constitution of a video call control server according to the second exemplary embodiment. Referring to FIG. 11, the video call control server 704 includes a communicator 1100, a storage 1102, an image analyzer 1104, and a combined image generator 1106.

The communicator 1100 performs communication for a video call with respective terminals 702. For example, the communicator 1100 receives captured images from the respective terminals 702. Here, the captured images may be images rotated by image rotators 1004. Also, the communicator 1100 transmits a combined image generated by the combined image generator 1106 to the respective terminals 702.

The storage 1102 stores captured images of the respective terminals 702 received by the communicator 1100. The storage 1102 may store the combined image generated by the combined image generator 1106. In this case, the storage 1102 may be a buffer that temporarily stores the captured images of the respective terminals 702 and the combined image.

The image analyzer 1104 analyzes the captured images of the respective terminals 702 received by the communicator 1100, thereby detecting current screen modes and aspect ratios of the respective terminals 702. In other words, the image analyzer 1104 analyzes a horizontal screen length (or resolution) and a vertical screen length (or resolution) of a captured image of each terminal 702, thereby detecting a current screen mode and an aspect ratio of the corresponding terminal 702.

The combined image generator 1106 generates the combined image by combining the captured images received from the respective terminals 702. The combined image generator 1106 may generate a combined image according to a current screen mode (horizontal screen mode or vertical screen mode) of each terminal 702. At this time, the combined image generator 1106 may generate the combined image with an aspect ratio of the terminal 702.

Figure 12:
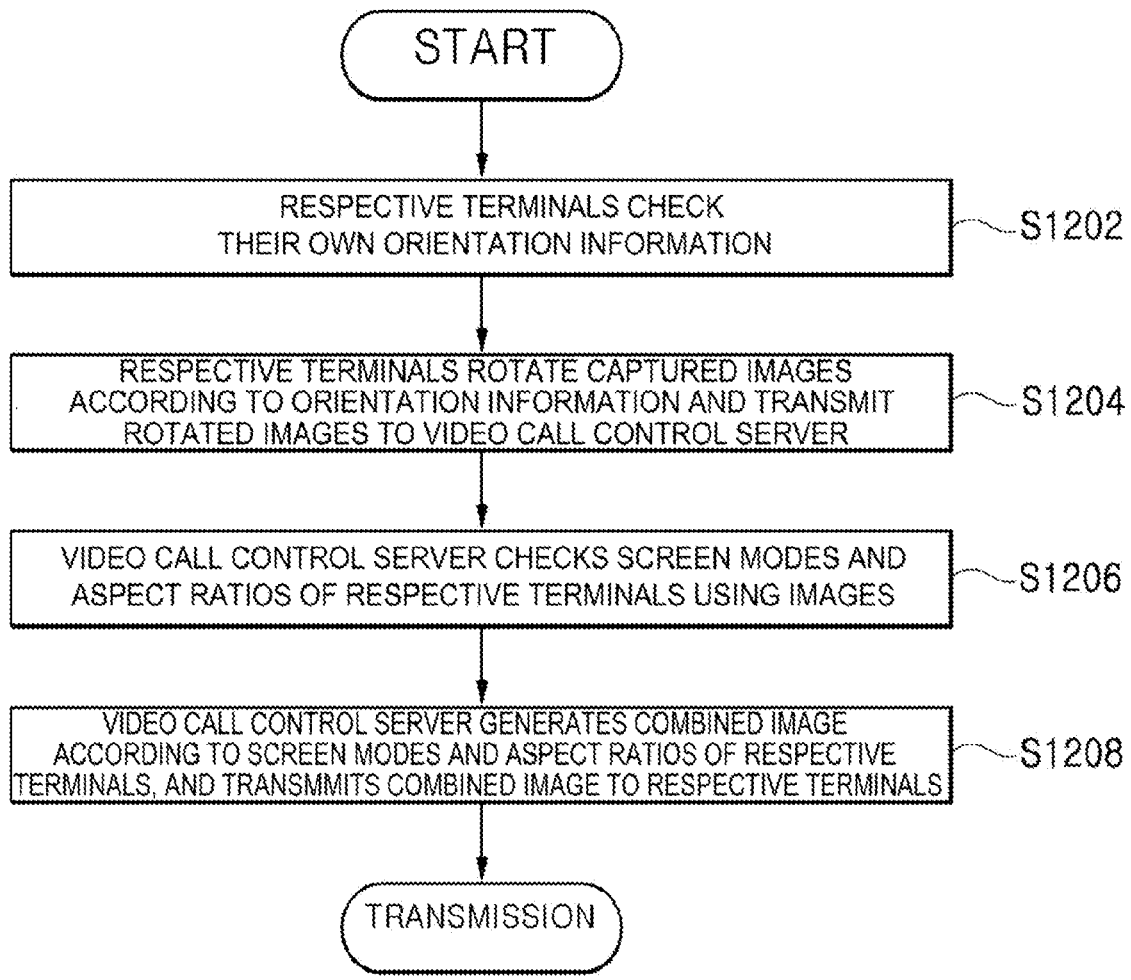
FIG. 12 is a flowchart illustrating a method for a video call according to the second exemplary embodiment.

FIG. 12 is a flowchart illustrating a method for a video call according to the second exemplary embodiment. Referring to FIG. 12, while requesting a video call from the video call control server 704, the respective terminals 702 check their own orientation information (S1202). At this time, the respective terminals 702 may check their own orientation information using a gyro sensor, a gravity sensor, etc. installed therein.

Next, the respective terminals 702 rotate captured images according to their own orientation information, and transmit the rotated images to the video call control server 704 (S1204). At this time, the respective terminals 702 may rotate the captured images so that video call users are displayed in a previously set reference direction in the images.

Next, the video call control server 704 checks current screen modes and aspect ratios of the respective terminals 702 using the images transmitted from the respective terminals 702 (S1206).

Next, the video call control server 704 generates a combined image according to a current screen mode and an aspect ratio of each terminal 702 using an image transmitted from the terminal 702, and then transmits the combined image to the terminal 702 (S1208).

Meanwhile, when a orientation of a given terminal 702 is changed during a video call, the terminal 702 may rotate a captured image according to the changed orientation, and then transmit the rotated image to the video call control server 704. Then, after analyzing the captured image rotated according to the changed orientation, the video call control server 704 may generate a combined image corresponding to a current screen mode of the corresponding terminal 702 and transmit the combined image to the terminal 702.

Meanwhile, exemplary embodiments may include a computer-readable recording medium including a program for performing the methods described herein on a computer. The computer-readable recording medium may separately include program commands, local data files, local data structures, etc. or include a combination of them. The medium may be specially designed and configured for the present disclosure, or known and available to those of ordinary skill in the field of computer software. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers. A computer, such as the one mentioned above, is very familiar to those who practice in these technical arts. Therefore, the discussion herein has avoided obscuring the key features of the exemplary embodiments by purposefully omitting details concerning the manner in which a hardware processor of such a computer system uses the above-identified computer-readable codes and data storage device to carry out the various functions or implement the various units previously mentioned. Likewise, since a person familiar with this field understands that such functions and units may be implemented through various combinations of hardware and/or software, such implementation details are likewise omitted.

In exemplary embodiments, even when respective terminals capture users in different orientations and perform a video call, it is possible to receive a combined image of respective images in which video call users are all displayed in a reference direction from a video call control server. In this case, the users of the respective terminals can enjoy the video call without viewing other users in an unnatural orientation.

It will be apparent to those skilled in the art that various modifications can be made to the above-described exemplary embodiments without departing from the spirit or scope of the present disclosure. Thus, it is intended that the present disclosure covers all such modifications provided they come within the scope of the appended claims and their equivalents.

DESCRIPTION OF REFERENCE NUMBERS 200, 700: system for video call
202, 702: terminal
204, 704: video call control server
500: communicator
502: storage
504: image rotator
506: combined image generator
1000: capturing unit
1002: orientation sensor
1004: image rotator
1006: video call unit
1100: communicator
1102: storage
1104: image analyzer
1106: combined image generator

What is claimed is:

1. A system for video call, comprising:
one or more terminals configured to transmit images obtained by capturing video call users; and
a video call control server configured to generate a combined image by combining the images transmitted by the one or more terminals, and to transmit the combined image to the terminals,
wherein the respective images are rotated according to information on orientations, which indicates how much the terminals are rotated with respect to a reference orientation, sensed by the terminals and combined into the combined image,
wherein the video call control server separately generates as many combined images as there are different aspect ratios among the images transmitted by the terminals, and
wherein each of the terminals transmits, to the video call control server, reference aspect ratio information indicating a width-to-height ratio of said each of the terminals in the reference orientation.

2. The system of claim 1, wherein the terminals transmit the orientation information to the video call control server, and
the video call control server rotates the images received from the terminals to a reference orientation according to the received orientation information, and generate the combined image by combining the rotated images.

3. The system of claim 2, wherein the aspect ratio information on the terminals are transmitted together with the orientation information.

4. The system of claim 2, wherein, when the orientations of the terminals are changed after transmission of the orientation information, the terminals transmit orientation information corresponding to the changed orientations to the video call control server.

5. The system of claim 1, wherein the terminals sense the orientations, rotate the captured images to a reference orientation according to the information on the sensed orientations, and transmit the rotated images to the video call control server.

6. The system of claim 5, wherein, when the orientations of the terminals are changed after transmission of the orientation information, the terminals rotate the captured images according to orientation information corresponding to the changed orientations, and transmit the rotated images to the video call control server.

7. The system of claim 5, wherein the video call control server checks screen modes of the terminals using the images transmitted by the terminals, generates the combined image according to the screen modes, and transmits the combined image to the terminals.

8. The system of claim 7, wherein the video call control server checks aspect ratios of the terminals together with the screen modes using the images received from the terminals, generates the combined image according to the screen modes and the aspect ratios, and transmits the combined image to the terminals.

9. A method for a video call, comprising:
transmitting, at one or more terminals, images obtained by capturing video call users;
generating, at a video call control server, a combined image by combining the images transmitted by the one or more terminals; and
transmitting, at the video call control server, the combined image to the terminals,
wherein the respective images constituting the combined image are rotated according to information on orientations, which indicates how much the terminals are rotated with respect to a reference orientation, sensed by the terminals and combined,
wherein the generating comprises separately generating as many combined images as there are different aspect ratios among the images transmitted by the terminals,
wherein transmitting the images comprises transmitting, at each of the terminals, reference aspect ratio information indicating a width-to-height ratio of said each of the terminals in the reference orientation, to the video call control server.

10. The method of claim 9, wherein transmitting the images further includes transmitting the orientation information on the terminals to the video call control server, and
generating the combined image includes rotating the images received from the terminals to a reference orientation according to the received orientation information, and generating the combined image by combining the rotated images.

11. The method of claim 10, wherein transmitting the aspect ratio information on the terminals includes transmitting the aspect ratio information on the terminals together with the orientation information to the video call control server.

12. The method of claim 10, further comprising, when the orientations of the terminals are changed after transmitting the orientation information, transmitting, at the terminals, orientation information corresponding to the changed orientations to the video call control server.

13. The method of claim 9, wherein transmitting the images includes: sensing the orientations of the terminals; and rotating the captured images to a reference orientation according to the information on the sensed orientations, and transmitting the rotated images to the video call control server.

14. The method of claim 13, further comprising, when the orientations of the terminals are changed after transmitting the orientation information, rotating, at the terminals, the captured images according to orientation information corresponding to the changed orientations, and transmitting the rotated images to the video call control server.

15. The method of claim 13, wherein generating the combined image further includes:
checking screen modes of the terminals using the images transmitted by the terminals; and
generating the combined image according to the screen modes.

16. The method of claim 15, wherein generating the combined image further includes:
checking aspect ratios of the terminals together with the screen modes using the images received from the terminals; and
generating the combined image according to the screen modes and the aspect ratios.

17. A video call control server, comprising:
a communicator configured to receive orientation information on one or more terminals, which indicates how much the terminals are rotated with respect to a reference orientation, and images obtained by capturing the corresponding video call users from the one or more terminals;
an image rotator configured to rotate an image required to be rotated to the reference orientation according to the orientation information among the images received by the communicator to the reference orientation; and
a combined image generator configured to generate a combined image by combining an image not required to be rotated to the reference orientation among the images received by the communicator and the image having been rotated to the reference orientation by the image rotator among the images received by the communicator,
wherein the communicator transmits the combined image to the respective terminals,
wherein the combined image generator separately generates as many combined images as there are different aspect ratios among the images transmitted by the terminals,
wherein the communicator receives, from the respective terminals, reference aspect ratio information indicating a width-to-height ratio of the respective terminals in the reference orientation.

18. The video call control server of claim 17, wherein the communicator receives the reference aspect ratio information on the respective terminals together with the orientation information from the respective terminals.

19. The video call control server of claim 18, wherein the combined image generator generates the combined image according to the reference aspect ratio information and the orientation information.

20. A video call control server, comprising:
a communicator configured to receive images obtained by capturing video call users from one or more terminals;
an image analyzer configured to detect screen modes of the respective terminals from the received images; and
a combined image generator configured to generate a combined image by combining the received images according to the detected screen modes of the respective terminals, wherein the communicator transmits the combined image to the respective terminals, and wherein the screen modes of the respective terminals comprise a horizontal screen mode and a vertical screen mode, wherein the combined image generator separately generates as many combined images as there are different aspect ratios among the images transmitted by the terminals, wherein the image analyzer detects, from the received images, aspect ratios of the respective terminals indicating a width-to-height ratio of the respective terminals in a reference orientation.

21. The video call control server of claim 20, wherein the combined image generator generates the combined image by combining the received images according to the screen modes and the aspect ratios of the respective terminals.

22. A terminal used in a video call system, comprising:

a capturing unit configured to capture a video call user;

an orientation sensor configured to sense a state in which the terminal has been rotated with respect to a previously set reference orientation;

an image rotator configured to rotate the image captured by the capturing unit according to the rotation state; and a video call unit configured to transmit the image captured by the capturing unit, aspect ratio information on the terminal which indicates a width-to-height ratio of the terminal in the reference orientation, and information on orientation sensed by the orientation sensor or the image rotated by the image rotator.

* * * * *